United States Patent
Palinkas

(10) Patent No.: US 8,061,698 B2
(45) Date of Patent: Nov. 22, 2011

(54) GEOMETRIC SHAPED SIDE BEARING PAD

(75) Inventor: Richard L. Palinkas, Northfield, CT (US)

(73) Assignee: Chemtura Corporation, Middlebury, CT (US)

( * ) Notice: Subject to any disclaimer, the term of this patent is extended or adjusted under 35 U.S.C. 154(b) by 819 days.

(21) Appl. No.: 11/584,204

(22) Filed: Oct. 20, 2006

(65) Prior Publication Data

US 2008/0023898 A1    Jan. 31, 2008

Related U.S. Application Data

(63) Continuation-in-part of application No. 11/495,409, filed on Jul. 27, 2006, now abandoned.

(51) Int. Cl.
F16F 1/36    (2006.01)

(52) U.S. Cl. ........ 267/292; 267/141; 267/153; 267/152; 105/199.1; 105/199.2; 105/199.3; 105/199.4; 248/560

(58) Field of Classification Search .......... 267/141, 267/153, 145, 152, 139; 105/119.1–119.4; 248/560; 384/42, 308
See application file for complete search history.

(56) References Cited

U.S. PATENT DOCUMENTS

| | | | | |
|---|---|---|---|---|
| 2,813,712 A | * | 11/1957 | Stanis | 267/257 |
| 2,817,510 A | * | 12/1957 | Hoban | 267/292 |
| 3,418,815 A | * | 12/1968 | Kumazawa | 405/215 |
| 3,708,988 A | * | 1/1973 | Miura | 405/215 |
| 3,779,536 A | * | 12/1973 | Lachmann | 267/140 |
| 3,820,495 A | * | 6/1974 | Ueda | 14/219 |
| 3,831,923 A | * | 8/1974 | Meldrum | 267/141 |
| 3,932,005 A | * | 1/1976 | Miller | 384/423 |
| 3,948,500 A | * | 4/1976 | Korbuly et al. | 267/140 |
| RE30,461 E | | 12/1980 | Bogar et al. | |
| 4,277,055 A | * | 7/1981 | Yamaguchi et al. | 267/140 |
| 4,319,539 A | * | 3/1982 | Fujii et al. | 114/219 |
| 4,356,775 A | | 11/1982 | Paton et al. | |
| 4,463,836 A | | 8/1984 | Murphy et al. | |
| 4,471,857 A | | 9/1984 | Murphy | |
| 4,480,721 A | | 11/1984 | Murphy | |
| 4,548,150 A | * | 10/1985 | Drewett | 114/219 |
| 4,567,833 A | | 2/1986 | Hanson | |
| 4,712,487 A | | 12/1987 | Carlson | |
| 4,756,266 A | * | 7/1988 | Sakuraoka | 114/219 |
| 4,895,355 A | * | 1/1990 | Wolf et al. | 267/257 |

(Continued)

FOREIGN PATENT DOCUMENTS

DE    41 36 598 A1    5/1993

(Continued)

*Primary Examiner* — Robert Siconolfi
*Assistant Examiner* — James Hsiao
(74) *Attorney, Agent, or Firm* — JoAnn Villamizar

(57) ABSTRACT

A geometric shaped side bearing pad includes a top and a surface extending an angle θ towards the top, wherein the bearing pad has a geometric shape and a non-linear spring rate which levels out a reaction force without buckling. The surface of the bearing pad can have two sides or four sides, can have spacing within the surface, or can be solid. The angle θ can be within the range of about 20 degrees and 85 degrees, and may preferably be within the range of about 30 degrees and 45 degrees to achieve non-linear load/deflection. The top of the bearing pad can have a slot defined therethrough to accommodate a protrusion in a fixture to engage the bearing pad. The bearing pad can provide a friction contact with an object and enables lateral force transfer to the bearing pad, thereby providing lateral stiffness.

11 Claims, 2 Drawing Sheets

U.S. PATENT DOCUMENTS

| | | | |
|---|---|---|---|
| 4,962,861 A | 10/1990 | Wiebe | |
| 4,962,916 A | 10/1990 | Palinkas | |
| 5,036,774 A | 8/1991 | Curtis et al. | |
| 5,054,414 A * | 10/1991 | Yamaguchi | 114/219 |
| 5,118,086 A | 6/1992 | Stevenson et al. | |
| 5,119,833 A * | 6/1992 | Powers | 128/865 |
| 5,137,313 A * | 8/1992 | Teig | 293/102 |
| 5,293,973 A * | 3/1994 | Thum | 188/377 |
| 5,358,684 A | 10/1994 | Valentin | |
| 5,417,531 A * | 5/1995 | Brown | 411/344 |
| 5,419,539 A * | 5/1995 | Bressler | 267/292 |
| 5,458,077 A * | 10/1995 | Enami et al. | 114/219 |
| 5,718,543 A | 2/1998 | Jensen | |
| 5,988,609 A * | 11/1999 | Young | 267/140 |
| 6,092,470 A | 7/2000 | O∂Donnell | |
| 6,158,726 A * | 12/2000 | Coleman et al. | 267/292 |
| 6,247,564 B1 * | 6/2001 | Kim | 188/300 |
| 6,328,145 B1 * | 12/2001 | Villemin et al. | 188/377 |
| 6,419,214 B2 | 7/2002 | Palinkas | |
| 6,572,307 B2 * | 6/2003 | Tajima et al. | 405/212 |
| 6,604,735 B2 * | 8/2003 | McCollough et al. | 267/140 |
| 6,708,624 B2 | 3/2004 | Faryniak et al. | |
| 6,723,771 B2 | 4/2004 | Palinkas et al. | |
| 6,755,402 B2 * | 6/2004 | McCollough et al. | 267/141 |
| 6,857,166 B2 * | 2/2005 | Nakagaki et al. | 16/86 R |
| 7,044,061 B2 | 5/2006 | O∂Donnell et al. | |
| 7,228,949 B2 * | 6/2007 | Namiki et al. | 188/381 |
| 2002/0105121 A1 * | 8/2002 | Monson et al. | 267/136 |
| 2007/0234527 A1 | 10/2007 | Aoyama | |

FOREIGN PATENT DOCUMENTS

| | | |
|---|---|---|
| DE | 41 36598 | 5/1993 |
| WO | WO 01/23773 A1 | 4/2001 |
| WO | WO 2006/057150 A1 | 6/2006 |

* cited by examiner

GEOMETRIC SHAPED SIDE BEARING PAD

CROSS-REFERENCE TO RELATED APPLICATIONS

This application is a continuation-in-part of U.S. patent application Ser. No. 11/495,409, filed Jul. 27, 2006, now abandoned the contents of which are incorporated herein by reference.

BACKGROUND OF THE INVENTION

1. Field of the Invention

The present invention generally relates to bearings and, more particularly, to a geometric shaped side bearing pad.

2. Description of the Related Art

Rail cars are typically equipped with wheeled trucks including side bearings that are adapted, for example, to absorb energy in response to large impact loads, to control or restrict hunting movements of the rail cars, to decrease warping tendencies of the rail cars, to provide better curving characteristics of the rail cars, etc. Truck hunting occurs during movement of a rail car over tracks or rails and is caused mainly by worn wheels and/or worn rail. Truck hunting can lead to rapid truck component wear and can cause high speed derailments.

Side bearing developments to reduce or otherwise control adverse truck action have been ongoing for years. For example, side bearings have been developed with various types of springs, hydraulics dampers, yaw dampers, etc. Some side bearings use compressed resilient members, such as spring loaded members, elastomeric members, etc. Side bearing pads have normally been formed as straight cylinders or columns, toroids, or metal-rubber sandwich structures.

Side bearings have also used different forms of thermoplastic elastomers to absorb necessary forces encountered in railroad cars, and typically require special fixturing. U.S. Pat. Nos. 4,962,916, 6,419,214 B2, and 6,723,771 B2, issued Oct. 16, 1990, Jul. 16, 2002, and Apr. 20, 2004, respectively, to at least the present inventor, describe compression springs, non-linear spring rate sway bar bushings, and high friction polyurethane elastomers having improved abrasion resistance, and are incorporated herein by reference.

A side bearing pad having a spring rate that allows the storage of deflection energy while limiting reaction force is desirable.

SUMMARY OF THE INVENTION

Accordingly, it is an object of the present invention to provide a geometric shaped side bearing pad for any suspension or spring application for which energy needs to be absorbed while controlling the maximum reaction force, such as side bearers, dock fendering, ride bumpers, certain impact bumpers, etc. The bearing pad may be used with many existing bearing boxes that previously held other types of bearing pads, such as the rubber metal sandwich pad. The bearing pad provides a non-linear spring rate that levels out the reaction force without buckling. The bearing pad does not need bonding.

According to one aspect of the present invention, a bearing pad includes a top and a surface extending an angle θ towards the top, wherein the bearing pad has a geometric shape and a non-linear spring rate that levels out the reaction force without buckling.

The geometric shape of the bearing pad can be a pyramid shape, a conical shape, a trapezoidal shape, a prismoid shape, etc. For example, as a pyramid shape, the surface of the bearing pad can have two or four sides, and can have spacing within the surface, or can be solid. The initial length $l_0$ of the surface can be formed so that $l_0$ is greater than a critical length $l_{cr}$, where $l_{cr}=l_0(1-\pi^2/s^2)$ and s is a slenderness ratio of the surface. When the bearing pad has spacing within the surface, the non-linear spring rate decreases with deflection.

The angle θ can be within the range of about 20 degrees and 85 degree, and may preferably be within the range of about 30 degrees and 45 degrees to achieve non-linear load/deflection. The top of the bearing pad can have a slot defined therethrough to accommodate a protrusion in a fixture to engage the bearing pad. The bearing pad can provide a friction contact with an object and enables lateral force transfer to the bearing pad, thereby providing lateral stiffness. The bearing pad can include polyurethane, such as thermoset polyurethane, thermoplastic polyurethane, or a two part castable urethanes made from polyether-isocyanate or polyester-isocyanate prepolymers cured with organic diamine or polyol materials.

BRIEF DESCRIPTION OF THE DRAWINGS

The above and other objects, features and advantages of the present invention will be more apparent from the following detailed description taken in conjunction with the accompanying drawings, in which.

DESCRIPTION OF THE PREFERRED EMBODIMENTS

Figure 1:
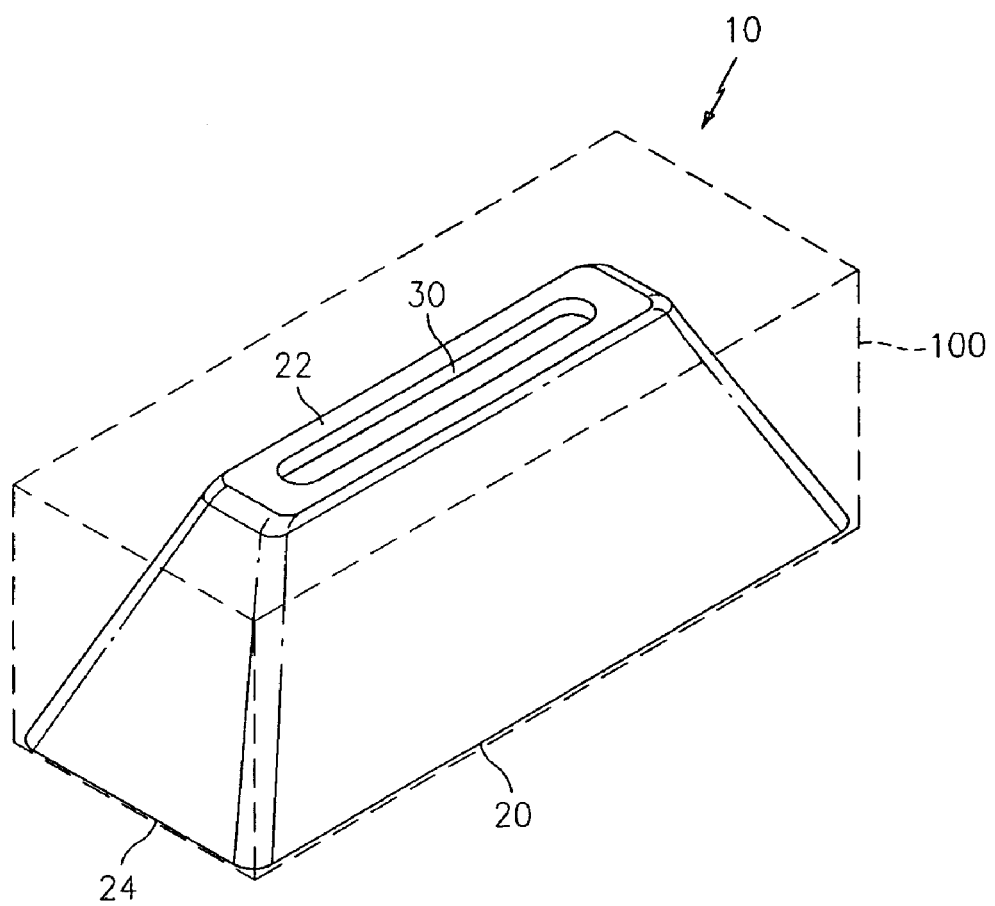
FIG. 1 is a perspective view of a geometric shaped side bearing pad according to the present invention.
Figure 2:
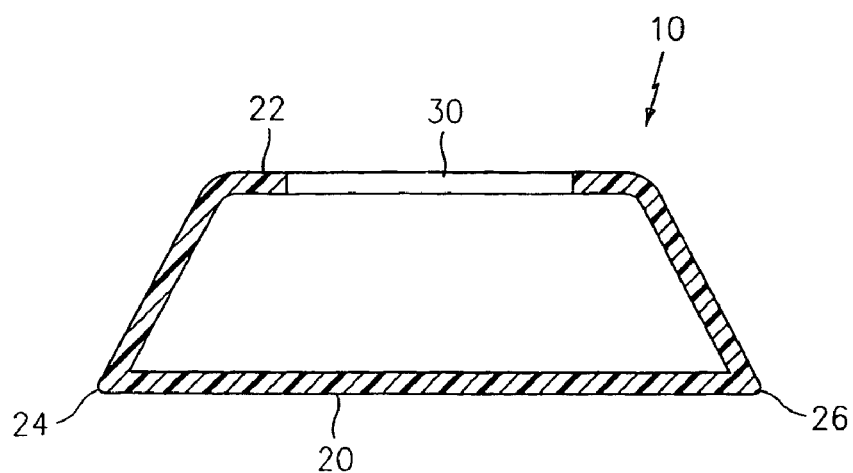
FIG. 2 is a cross-sectional view of the side bearing pad shown in FIG. 1.
Figure 3:
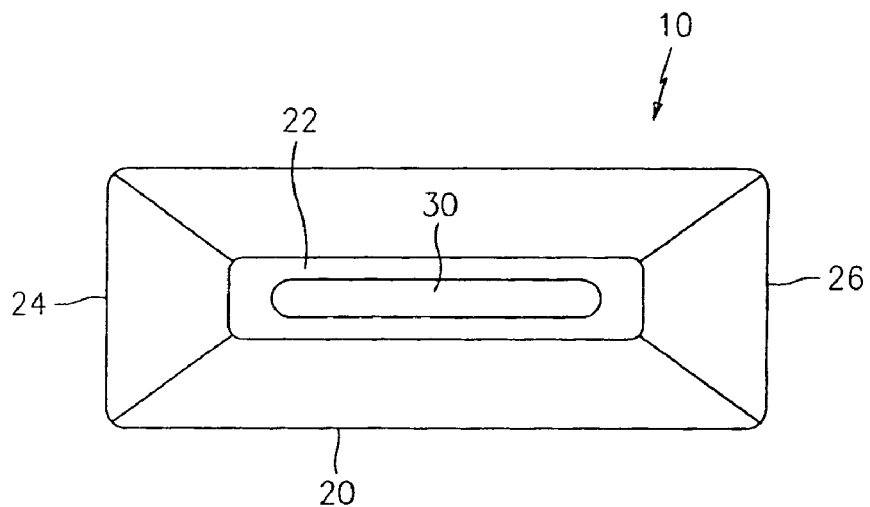
FIG. 3 is a top view of the side bearing pad shown in FIG. 1.
Figure 4:
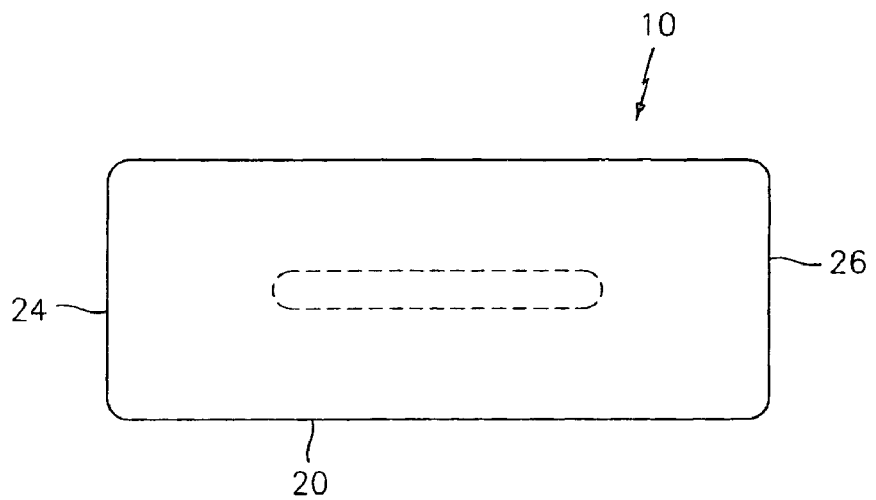
FIG. 4 is a bottom view of the side bearing pad shown in FIG. 1.

Hereinafter, preferred embodiments according to the present invention will be described with reference to the accompanying drawings. The same reference numerals are used to designate the same elements as those shown in other drawings. In the following description, a detailed description of known functions and configurations incorporated herein will be omitted when it may obscure the subject matter of the present invention.

Referring to the drawings, FIGS. 1-4 show a geometric shaped side bearing pad 10 according to the present invention. As shown in FIG. 1, the bearing pad 10 is contained within a bearing box 100 which forms no part of the invention. The geometric shape of the bearing pad can be a pyramid shape, a conical shape, a trapezoidal shape, a prismoid shape, etc. For example, as a pyramid shape, as shown in the drawings, the surface of the bearing pad 10 can have two or four sides, and can have spacing within the surface, or can be solid. The surface of the bearing pad 10 is shown with four sides that interconnect a base 20 and a top 22. However, the surface of the bearing pad 10 may be configured in a pyramid shape without the base 20 and end sides, having only two longitudinal sides, thereby simplifying the fabrication of the bearing pad 10. The base 20, when used, has a length and width. When formed as a conical shape, the surface of the bearing pad 10 would have a smooth surface extending from a circular base to a pointed top.

The illustrated surface of the bearing pad 10 has two longitudinal sides along the length of the bearing pad 10 that extend at an angle θ between a first end 24 of the base 20, a second end 26 of the base 20, and the top 22 of the bearing pad 10. The end sides along the width of the bearing pad 10 also extend at the angle θ between the base 20 and the top 22, when the end sides are used.

The top 22 of the bearing pad 10 is a height above the base 20. The top 22 has a slot 30 defined therethrough to accommodate a protrusion in a fixture to engage the bearing pad 10, provide a friction contact with an object, such as a rail car, and enable lateral force transfer to the bearing pad 10, thereby providing lateral stiffness. The surface and base 20 of the bearing pad 10 are restrained from moving out when under load. The bearing pad 10 does not need bonding. The coupling of the bearing pad 10 to an object, such as a rail car, may alternatively be by direct contact with a metal surface on the object using metal to elastomer friction to provide lateral constraint. A metal plate can also be bonded to the top of the bearing pad 10, as opposed to the slot 30. The bearing pad 10 is configured with a non-linear spring rate that levels out the reaction force while absorbing deflection energy without buckling.

The angle θ is within the range of about 20 degrees and 85 degree and, depending on the desired non-linear or linear spring rate, the angle θ may preferably be within the range of about 30 degrees and 45 degrees to achieve non-linear load/deflection. A linear spring rate can occur at various angles greater than about 60 degrees. For example, when the angle θ is about 60 degrees, the spring rate is linear. The angled surface enables the bearing pad 10 to resist buckling while being compressed. The angle θ chosen for a particular application can control the maximum reaction force.

The angle θ also provides clearance from the bearing box 100 when compressed. The base 20 of the bearing pad 10, when used, can be configured for being substantially aligned with a particular bearing box cavity. The bearing pad 10 preferably has spacing within the surface, the surface having a wall thickness, however, the bearing pad 10 may also be solid. When the bearing pad 10 has spacing between within the surface, the bearing pad 10 has a non-linear spring rate which decreases slowly with deflection to level out the reaction force without buckling. When the bearing pad 10 is solid, the bearing pad 10 has a non-linear spring rate which increases with deflection.

The length of the surface of the bearing pad 10 should be greater than a length where the surface buckles due to applied force, e.g. a critical length $l_{cr}$. The critical length $l_{cr}$ of the surface may be determined through use of the initial length of side, with no applied force, e.g. $l_0$, and the slenderness ratio s of the surface, as defined by $l_{cr} = l_0(1-\pi^2/s^2)$. The slenderness ratio s is a ratio based on the height and the radius of gyration of the surface, the computation of which is well known to those the structural arts.

The bearing pad 10 is preferably made of polyurethane, such as thermoset polyurethane, thermoplastic polyurethane, etc. The bearing pad 10 may also be made from DuPont Hytrel, a similar polymer, rubber, etc. Thermoset polyurethane provides a durable, resilient material that has good low and high temperature modulus retention, and has a higher modulus than a typical rubber compound. For example, the polyurethanes may be two part castable urethanes made from polyether-isocyanate or polyester-isocyanate prepolymers cured with organic diamine or polyol materials, such as ADRIENE® and VIBRATHANE® prepolymers.

The bearing pad 10 may be used for any suspension or spring application for which energy needs to be absorbed while controlling the maximum reaction force, such as side bearers, dock fendering, ride bumpers, certain impact bumpers, etc. The bearing pad 10 may be used with many existing bearing boxes that previously held other types of bearing pads, such as the rubber metal sandwich pad. The bearing pad 10 can also provide a non-linear spring rate that levels out the reaction force while absorbing deflection energy without buckling.

As compared to sandwich type bearing pads, the bearing pad 10 does not need bonding and has a more desirable non-linear spring rate. As compared to column type bearing pads, the bearing pad 10 fits into existing fixturing and has a more non-linear decreasing spring rate when the bearing pad 10 has spacing within the surface to level out the reaction force without buckling. The bearing pad 10 also requires no special fixturing and can have a decreasing spring rate when the bearing pad 10 has spacing within the surface, as opposed to an increasing spring rate of toroidal type bearing pads.

Although preferred embodiments of the present invention have been described for illustrative purposes, those skilled in the art will appreciate that various modifications, additions and substitutions are possible, without departing from the scope and spirit of the invention as disclosed in the accompanying claims, including the full scope of equivalents thereof.

What is claimed is:

1. A bearing pad comprising:
a top and a base parallel to the top;
a slot in the top, wherein the top defines a top plane and wherein the slot is through the top plane, and the slot is completely surrounded by the top; and
four walls each having an inner surface and an outer surface that connect the top and the base,
wherein the inner and outer surface of each of said walls extend at an angle from 30 to 45 degrees from the base towards the top
and the inner surface of each of said four walls, top and base define a cavity that extends through said slot, and
the cavity does not extend through any of the four walls or the base,
wherein the bearing pad has a non-linear spring rate which levels out a reaction force applied to the top and base without buckling.

2. A bearing pad according to claim 1, wherein an initial length $l_o$ of each of the four walls formed so that $l_o$ is greater than a critical length $l_{cr}$, where $l_{cr}$ $l_o(1-\pi^2/s^2)$ and s is a slenderness ratio of the surface.

3. A bearing pad according to claim 1, wherein the slot is configured to accommodate a protrusion in a fixture to engage the bearing pad.

4. A bearing pad according to claim 1, wherein the bearing pad comprises polyurethane.

5. A bearing pad according to claim 4, wherein the bearing pad comprises thermoset polyurethane.

6. A bearing pad according to claim 4, wherein the bearing pad comprises thermoplastic polyurethane.

7. A bearing pad according to claim 4, wherein the bearing pad comprises two part castable urethanes made from polyether-isocyanate prepolymers cured with organic diamine materials.

8. A bearing pad according to claim 4, wherein the bearing pad comprises two part castable urethanes made from polyether-isocyanate prepolymers cured with polyol materials.

9. A bearing pad according to claim 4, wherein the bearing pad comprises two part castable urethanes made from polyester-isocyanate prepolymers cured with organic diamine materials.

10. A bearing pad according to claim 4, wherein the bearing pad comprises two part castable urethanes made from polyester-isocyanate prepolymers cured with organic polyol materials.

11. A bearing pad according to claim 3, wherein the slot provides a friction contact with the protrusion, and wherein the slot enables a lateral force transfer from the protrusion to the bearing pad.

* * * * *